US011938932B2

(12) United States Patent
Lord et al.

(10) Patent No.: US 11,938,932 B2
(45) Date of Patent: *Mar. 26, 2024

(54) SYSTEMS AND METHODS FOR SELF-DRIVING VEHICLE COLLISION PREVENTION

(71) Applicant: Clearpath Robotics Inc., Kitchener (CA)

(72) Inventors: Matthew Lord, Kitchener (CA); Ryan Christopher Gariepy, Kitchener (CA); Peiyi Chen, Waterloo (CA); Michael Irvine, Mississauga (CA); Alex Bencz, Kitchener (CA)

(73) Assignee: CLEARPATH ROBOTICS INC., Kitchener (CA)

( * ) Notice: Subject to any disclaimer, the term of this patent is extended or adjusted under 35 U.S.C. 154(b) by 33 days.

This patent is subject to a terminal disclaimer.

(21) Appl. No.: 17/840,915

(22) Filed: Jun. 15, 2022

(65) Prior Publication Data

US 2023/0001921 A1 Jan. 5, 2023

Related U.S. Application Data

(63) Continuation of application No. 16/699,015, filed on Nov. 28, 2019, now Pat. No. 11,390,277.

(Continued)

(51) Int. Cl.
*B60W 30/095* (2012.01)
*B60W 40/105* (2012.01)
*G05D 1/00* (2006.01)

(52) U.S. Cl.
CPC ...... *B60W 30/0953* (2013.01); *B60W 40/105* (2013.01); *G05D 1/0055* (2013.01);

(Continued)

(58) Field of Classification Search
CPC .......... B60W 30/0953; B60W 40/105; B60W 2554/00; G05D 1/0055; G05D 1/0088; G05D 2201/0213
See application file for complete search history.

(56) References Cited

U.S. PATENT DOCUMENTS 5,581,250 A 12/1996 Khvilivitzky
5,700,074 A 12/1997 Sugimoto et al.
(Continued)

FOREIGN PATENT DOCUMENTS

WO 2015008380 A1 1/2015

OTHER PUBLICATIONS

Xiao et al., Pallet recognition and localization using an RGB-D camera, Sep. 13, 2017, International Journal of Advanced Robotic Systems, (Year: 2017).

*Primary Examiner* — Ramsey Refai

(57) ABSTRACT

Systems and methods for self-driving collision prevention are presented. The system comprises a self-driving vehicle safety system, having one or more sensors in communication with a control system. The control system is configured determine safety fields and instruct the sensors to scan a region corresponding to the safety fields. The control system determines exclusion regions, and omits the exclusion regions from the safety field. The safety system may also include capability reduction parameters that can be used to constrain the drive system of the vehicle, for example, by restricting turning radius and speed in accordance with the safety fields.

18 Claims, 12 Drawing Sheets

Related U.S. Application Data

(60) Provisional application No. 62/773,445, filed on Nov. 30, 2018.

(52) U.S. Cl.
CPC ....... *G05D 1/0088* (2013.01); *B60W 2554/00* (2020.02); *G05D 2201/0213* (2013.01)

(56) References Cited

U.S. PATENT DOCUMENTS

| | | |
|---|---|---|
| 5,785,281 A | 7/1998 | Peter et al. |
| 5,806,938 A | 9/1998 | Stumpe et al. |
| 5,983,161 A | 11/1999 | Lemelson et al. |
| 6,406,132 B1 | 6/2002 | Breed et al. |
| 9,102,406 B2 | 8/2015 | Stark et al. |
| 9,141,109 B1 | 9/2015 | Kamata |
| 9,187,088 B1 | 11/2015 | Ferguson et al. |
| 9,383,753 B1 | 7/2016 | Templeton et al. |
| 9,442,487 B1 | 9/2016 | Ferguson et al. |
| 9,671,791 B1 | 6/2017 | Paczan |
| 9,779,314 B1 | 10/2017 | Wendel et al. |
| 9,896,030 B2 | 2/2018 | Sugimoto |
| 10,019,008 B2 | 7/2018 | Kong et al. |
| 10,328,942 B2 | 6/2019 | Kelly et al. |
| 10,446,034 B2 | 10/2019 | Akamine et al. |
| 10,909,629 B1 | 2/2021 | Madigan et al. |
| 11,225,275 B2 | 1/2022 | Gariepy |
| 11,305,593 B2 | 4/2022 | Coombs |
| 2002/0013651 A1 | 1/2002 | Weiberle et al. |
| 2002/0137489 A1 | 9/2002 | Dutta et al. |
| 2003/0096594 A1 | 5/2003 | Naboulsi |
| 2004/0204803 A1 | 10/2004 | Matsuda et al. |
| 2005/0023052 A1 | 2/2005 | Beck et al. |
| 2007/0106473 A1 | 5/2007 | Bodin et al. |
| 2008/0018472 A1 | 1/2008 | Dasilva et al. |
| 2008/0106886 A1 | 5/2008 | Sugimoto et al. |
| 2009/0210109 A1 | 8/2009 | Ravenscroft |
| 2009/0222134 A1 | 9/2009 | Franke et al. |
| 2011/0015844 A1 | 1/2011 | Perkins et al. |
| 2011/0021310 A1 | 1/2011 | Kresse et al. |
| 2011/0210529 A1 | 9/2011 | Markstaller |
| 2012/0310466 A1 | 12/2012 | Fairfield et al. |
| 2013/0142393 A1 | 6/2013 | Lord et al. |
| 2013/0144480 A1 | 6/2013 | Kobayashi et al. |
| 2013/0197760 A1 | 8/2013 | Castaneda et al. |
| 2013/0253770 A1 | 9/2013 | Nishikawa et al. |
| 2013/0311075 A1 | 11/2013 | Tran et al. |
| 2014/0214255 A1 | 7/2014 | Dolgov et al. |
| 2014/0277888 A1 | 9/2014 | Dastoor et al. |
| 2014/0365113 A1 | 12/2014 | Mcgavran et al. |
| 2015/0046034 A1 | 2/2015 | Kikuchi |
| 2015/0161872 A1 | 6/2015 | Beaulieu et al. |
| 2015/0239442 A1 | 8/2015 | Yamakado et al. |
| 2015/0251658 A1 | 9/2015 | Kato |
| 2015/0266487 A1 | 9/2015 | Kato |
| 2015/0269860 A1 | 9/2015 | Shaw et al. |
| 2015/0291210 A1 | 10/2015 | Kageyama |
| 2016/0001775 A1 | 1/2016 | Wilhelm et al. |
| 2016/0059851 A1 | 3/2016 | Klier et al. |
| 2016/0068267 A1 | 3/2016 | Liu et al. |
| 2016/0093210 A1 | 3/2016 | Bonhomme |
| 2016/0193999 A1 | 7/2016 | Sasabuchi |
| 2016/0250930 A1 | 9/2016 | Collins et al. |
| 2016/0304198 A1 | 10/2016 | Jourdan |
| 2016/0318445 A1 | 11/2016 | Sugimoto |
| 2017/0036771 A1 | 2/2017 | Woodman et al. |
| 2017/0076616 A1 | 3/2017 | Kanade et al. |
| 2017/0102241 A1 | 4/2017 | Paduano et al. |
| 2017/0158178 A1 | 6/2017 | Kerber et al. |
| 2017/0188510 A1 | 7/2017 | Einecke et al. |
| 2017/0253241 A1 | 9/2017 | Filev et al. |
| 2017/0355360 A1 | 12/2017 | Reed et al. |
| 2018/0012490 A1 | 1/2018 | Jodorkovsky et al. |
| 2018/0162349 A1 | 6/2018 | Chang et al. |
| 2018/0211536 A1 | 7/2018 | Akamine et al. |
| 2018/0264950 A1 | 9/2018 | Yokoyama et al. |
| 2018/0297585 A1 | 10/2018 | Lian et al. |
| 2018/0339701 A1 | 11/2018 | Kwon |
| 2019/0079537 A1 | 3/2019 | Yoshida et al. |
| 2019/0092347 A1 | 3/2019 | Kim |
| 2019/0120951 A1 | 4/2019 | Fischer |
| 2019/0202465 A1 | 7/2019 | Kato et al. |
| 2019/0294167 A1 | 9/2019 | Kutila et al. |
| 2019/0344796 A1 | 11/2019 | Lian et al. |
| 2020/0239242 A1 | 7/2020 | Hoofard et al. |
| 2020/0284601 A1 | 9/2020 | Myers et al. |
| 2022/0005291 A1 | 1/2022 | Konrardy |

SYSTEMS AND METHODS FOR SELF-DRIVING VEHICLE COLLISION PREVENTION

CROSS-REFERENCE TO RELATED PATENT APPLICATION

The application is a continuation of U.S. patent application Ser. No. 16/699,015 filed on Nov. 28, 2019, which claims the benefit of U.S. Provisional Application No. 62/773,445, filed on Nov. 30, 2018. The complete disclosure of each of U.S. application Ser. No. 16/699,015 and Provisional Application No. 62/773,445 is incorporated herein by reference.

TECHNICAL FIELD

The described embodiments relate to the operation of self-driving vehicles, and in particular to self-driving vehicle collision avoidance.

BACKGROUND

Self-driving vehicles have applications as material-transport vehicles for us in industrial manufacturing and warehousing facilities, as well as cars and trucks on public roadways. For all self-driving vehicles, collision prevention and safety are significant concerns. These vehicles typically rely on sensors in order to detect unexpected obstacles that may be in the vehicle's path.

However, broadly scanning the vehicle's environment for objects can have a negative effect on the vehicle's ability to navigate, since self-driving vehicles will typically restrict themselves from navigating into a space that is occupied by a perceived obstacle. Thus, the more obstacles that are detected, the less likely it is that the vehicle with collide with an undetected obstacle; and the fewer obstacles there are, the easier it is for the self-driving vehicle to navigate.

A solution is required that allows for an improved ability to navigate without substantially increasing the risk of collision.

SUMMARY

In a first aspect, there is a self-driving vehicle safety system. The system comprises one or more sensors and a control system in communication with the one or more sensors. The control system is configured to determine at least one safety field and instruct the sensors to scan a region corresponding to the at least one safety field. The control system determines the at least one safety field by omitting at least one exclusion region from the at least one safety field.

According to some embodiments, the self-driving vehicle safety system comprises vehicle dynamics attributes that are stored in a memory of the control system. The control system is configured to determine the at least one exclusion region based on the based on the vehicle dynamics attributes.

According to some embodiments, the self-driving vehicle safety system further comprises a navigational constraint stored in the memory of the control system. The control system is configured to determine the at least one exclusion region based on the navigational constraint.

According to some embodiments, the self-driving vehicle safety system further comprises capability reduction parameters stored in the memory of the control system. The capability reduction parameters correspond to the safety field. The control system is further configured to control a drive system of the self-driving vehicle according to the capability reduction parameters.

According to some embodiments, the capability reduction parameters comprise speed parameters and steering parameters. The control system is configured to limit the speed of the self-driving vehicle based on the speed parameters, and limit the steering of the self-driving vehicle based on the steering parameters.

According to some embodiments, the self-driving vehicle safety system is further configured to determine at least one footprint corresponding to the at least one safety field.

According to some embodiments, the control system is configured to determine a geometry of the at least one footprint based on a geometry of the corresponding safety field.

According to some embodiments, the control system is further configured to control the drive system based on the sensors detecting an obstacle within the footprint such that the obstacle does not enter the safety field.

According to some embodiments, the control system is configured to activate a safety-stop routine based on the sensors detecting an obstacle within the safety field.

In a second aspect, there is a method for self-driving vehicle collision avoidance. The method comprises receiving vehicle dynamics attributes pertaining to a self-driving vehicle and at least one speed of the self-driving vehicle using a control system of the self-driving vehicle. The method determines at least on safety field for the self-driving vehicle based on the vehicle dynamics attributes and the at least one speed of the self-driving vehicle. The method controls at least one sensor of the self-driving vehicle according to the safety. The safety field is based on omitting at least one exclusion region from the safety field.

According to some embodiments, receiving the vehicle dynamics attributes comprises retrieving the vehicle dynamics attributes form a memory of the self-driving vehicle.

According to some embodiments, receiving the speed of the self-driving vehicle comprises receiving the speed from at least one sensor of the self-driving vehicle.

According to some embodiments, receiving the speed of the self-driving vehicle comprises receiving a linear speed of the self-driving vehicle.

According to some embodiments, receiving the speed of the self-driving vehicle comprises receiving an angular speed of the self-driving vehicle.

According to some embodiments, receiving the vehicle dynamics attributes comprises receiving a mass attribute pertaining to the self-driving vehicle.

According to some embodiments, receiving the vehicle dynamics attributes comprises receiving a steering capability pertaining to the self-driving vehicle.

According to some embodiments, the method comprises obtaining a braking force pertaining to the self-driving vehicle.

According to some embodiments, obtaining the braking force comprises determining the braking force based on the vehicle dynamics attributes.

According to some embodiments, receiving the vehicle dynamics attributes comprises receiving one or more capability reduction parameters.

According to some embodiments, the capability reduction parameters pertain to steering the vehicle.

According to some embodiments, the capability reduction parameters pertain to a minimum turning radius limit for steering the vehicle.

According to some embodiments, the capability reduction parameters pertain to a maximum speed limit of the self-driving vehicle.

According to some embodiments, the exclusion region corresponds to the capability reduction parameters, and the method further comprises controlling the drive system of the self-driving vehicle based on the capability reduction parameters.

According to some embodiments, controlling the drive system comprises steering the self-driving vehicle such that the self-driving vehicle is not steered at a turning radius below the minimum turning radius limit.

According to some embodiments, controlling the drive system comprises driving the self-driving vehicle with the drive system such that the self-driving vehicle does not exceed the maximum speed limit.

According to some embodiments, the method further comprises determining a safe stopping distance for the self-driving vehicle based on the vehicle dynamics attributes.

According to some embodiments, determining the safe stopping distance is based on at least one speed of the self-driving vehicle.

According to some embodiments, determining the at least one safety field is based on the safe stopping distance.

According to some embodiments, the method further comprises receiving a navigational constraint with the control system.

According to some embodiments, the navigational constraint represents a minimum navigable width.

According to some embodiments, the method further comprises determining at least one footprint based on the at least one safety field.

According to some embodiments, the geometry of the at least one footprint is based on the geometry of the corresponding at least one safety field.

BRIEF DESCRIPTION OF THE DRAWINGS

A preferred embodiment of the present invention will now be described in detail with reference to the drawings, in which.

DETAILED DESCRIPTION

Self-driving material-transport vehicles navigate and travel within their environments by planning a path to a destination relative to their location within the environment and/or a map of the environment. As the vehicle travels its planned path, it uses sensors to detect objects the vehicle encounters while travelling in the environment. A vehicle may respond to a detected object in a variety of ways.

For example, when an object is detected within a particular region (relative to the vehicle), the vehicle may evoke a "safety stop", meaning that the vehicle stops (e.g. cuts power to the motors) in order to avoid a collision with the object. Such a region (relative to the vehicle) may be deemed a "safety field".

In another example, when object is detected within a particular region (relative to the vehicle), the vehicle may attempt to avoid the object by steering around the object. Such a region may be deemed a "vehicle footprint" of the vehicle. Generally, a vehicle footprint is larger than a safety field, and, in some cases, when an object is detected within the vehicle footprint, the vehicle steers in order to prevent the object from entering the safety field with the intention of avoiding a safety stop.

According to some embodiments, the vehicle navigates (e.g. plans a path through its environment) in consideration of one or both of the safety field and the footprint. Thus, while a larger safety field will generally result in an increase in safety, and a larger footprint will generally result in fewer safety stops, larger safety fields and footprints also result in the vehicle being less able to navigate throughout the environment. In effect, the minimum navigable space of the vehicle will increase.

Figure 1:
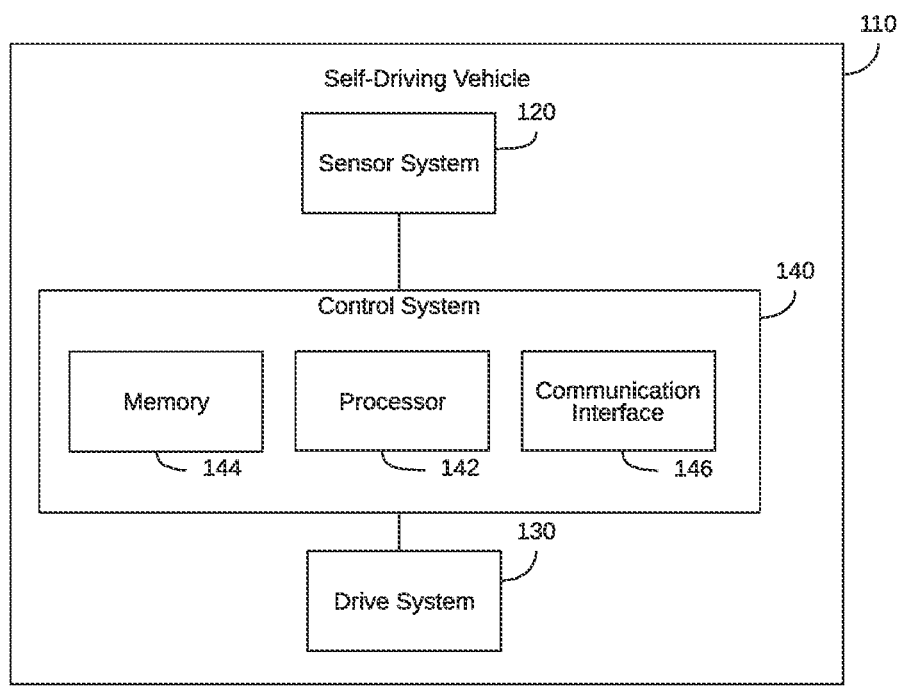
FIG. 1 is a block diagram of a self-driving vehicle, according to at least one embodiment.

Referring to FIG. 1, there is shown a block diagram of an example self-driving vehicle 110. The self-driving vehicle 110 includes a sensor system 120, a control system 140 and a drive system 130.

The sensor system 120 can include one or more sensors for collecting data from the environment of the self-driving vehicle 110. For example, the sensor system 120 can include a LiDAR device (or other optical, sonar, or radar-based range-finding devices operating on known principles such as time-of-flight). The sensor system 120 can include optical sensors, such as video cameras and systems (e.g., stereo vision, structured light).

The control system 140 can include a processor 142, a memory (or storage unit) 144, and a communication interface 146. The control system 140 facilitates the operation of the self-driving vehicle 110. The control system 140 can store an electronic map that represents the environment of the self-driving vehicle 110, such as a facility, in the memory 144.

The processor 142 can include any suitable processors, controllers or digital signal processors that can provide sufficient processing power depending on the configuration, purposes and requirements of the self-driving vehicle 110. In some embodiments, the processor 142 can include more than one processor with each processor being configured to perform different dedicated tasks.

The memory 144 can store data to be used during the operation of the self-driving vehicle 110 and/or to facilitate the operation of the self-driving vehicle 110. Example data can include operating data in respect of its operation, the electronic map representing its environment, data in respect of one or more other self-driving vehicles 110, data in respect of its mission, etc.

In some embodiments, the memory 144 can store software applications executable by the processor 142. For example, the software application includes drive system control and sensor system control applications.

The memory 144 can store data that may be used by the application executed by the processor 142. For example, the memory 144 can store vehicle dynamics attributes, navigational constraints, and capability reduction parameters, as will be further described. According to some embodiments, such data may be determined (e.g. generated or manipulated) by the processor 142 and stored in the memory 144. According to some embodiments, such data may be received from a fleet-management system or other computer system that is in communication with the vehicle (e.g. via the communication interface 146) and then stored in the memory.

The communication interface 146 can include any component for facilitating communication with the components of a communication system via a communication network. For example, the communication interface 146 can include a wireless transceiver for communicating within a wireless communications network.

The self-driving vehicle 110 can receive a mission from a fleet management system or other external system. The mission received from the fleet management system can include one or more waypoints or destination locations. Based on the received mission, the control system 140 can determine a path for the self-driving vehicle 110 to navigate to the waypoint or destination location with minimal, if any, instructions from another system or human operator. The control system 140 and the sensor system 120 can navigate the self-driving vehicle 110 without any additional navigational aids (e.g., navigational targets, magnetic strips, or paint/tape traces) installed in the environment.

For example, the control system 140 can generate a path for the self-driving vehicle 110 to a destination location based on the location of the self-driving vehicle 110. The control system 140 can then operate the drive system 130 to direct the self-driving vehicle 110 along the planned path. As the self-driving vehicle 110 travels along the planned path, the sensor system 120 can collect data from the environment, which includes detecting obstacles with which the vehicle might be on a collision course by staying on the planned path. The collected data can assist the control system 140 to track the progress of the self-driving vehicle 110 along the planned path, to update a location of the self-driving vehicle 110 within the environment, and to help the vehicle avoid collisions with obstacles. The control system 140 can determine when an unexpected obstacle is in the planned path using the data collected by the sensor system 120, and modify the planned path to navigate around the obstacle.

In some embodiments, the self-driving vehicle 110 can be equipped with one or more end effectors for facilitating interaction with objects within the environment. Example end effectors can include a gripper, a clamp, a shovel, a broom, a vacuum, a rotating spindle, or any other tools. The operation of the end effectors can be controlled by the control system 140 and, in some embodiments, with consideration of the data collected by the sensor system 120.

The self-driving vehicle 110 can operate in environments with varied terrains and/or regulated zones that require environmental qualifications. Example regulated zones can include sterile environments, and temperature-controlled environments (e.g., high or low temperature environments). The self-driving vehicle 110 can be configured to comply with the requirements of the various terrains and/or zones within its environment. For example, a self-driving vehicle 110 can be sterilized to operate in a sterile environment and subsequently only operate within the boundaries of the sterile environment in order to maintain its qualification. Self-driving vehicles 110 may undergo environmental testing or include higher rated components to meet other environmental qualifications.

According to some embodiments, the self-driving vehicle 110 may be a self-driving car or a self-driving truck that can operate on public roadways.

According to some embodiments, a self-driving vehicle safety system may include any or all of the components of the sensor system 120, the drive system 130, and the control system 140.

Figure 2:
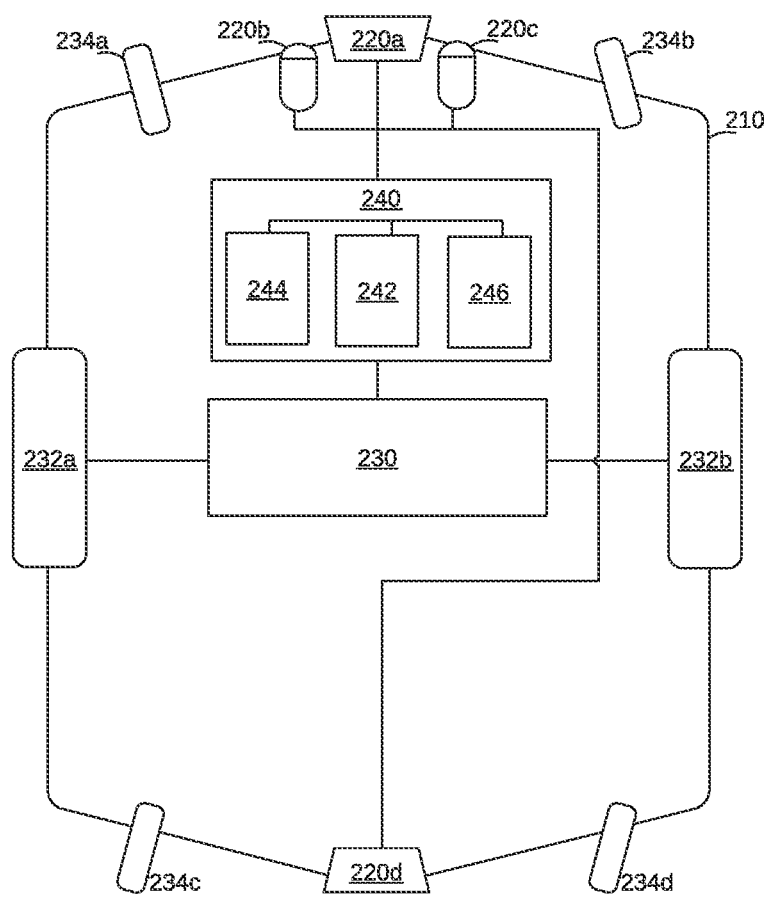
FIG. 2 is a system diagram of a self-driving vehicle, according to at least one embodiment.

Referring to FIG. 2, there is shown a block diagram of another example self-driving vehicle 210. The self-driving vehicle 210 can act as a self-driving material-transport vehicle 210 for transporting objects between different locations. The self-driving material-transport vehicle 210 can include a cargo component for carrying loads. For example, the cargo component can be a flatbed or a bucket having sidewalls to prevent loads from falling out as the self-driving transport vehicle 210 moves. The self-driving transport vehicle 210 can include cargo securing mechanisms to secure the load and prevent the load from falling off the self-driving transport vehicle 210. Although the self-driving vehicle 210 can act as a self-driving transport vehicle, the self-driving vehicle 210 is not limited to transporting objects.

Similar to the self-driving vehicle 110 of FIG. 1, the self-driving vehicle 210 includes a drive system 230, a sensor system 220 and a control system 240. According to some embodiments, a self-driving vehicle safety system may include any or all of the components of the sensor system 220, the drive system 230, and the control system 240.

The drive system 230 includes a motor and/or brakes connected to drive wheels 232a and 232b for driving the self-driving transport vehicle 210. The motor can be, but is not limited to, an electric motor, a combustion engine, or a combination/hybrid thereof. Depending on the application of the self-driving vehicle 210, the drive system 230 may also include control interfaces that can be used for controlling the drive system 230. For example, the drive system 230 may be controlled to drive the drive wheel 232a at a different speed than the drive wheel 232b in order to turn the self-driving transport vehicle 210. Different embodiments may use different numbers of drive wheels, such as two, three, four, etc.

A number of wheels 234 may be included. The self-driving vehicle 210 includes wheels 234a, 234b, 234c, and 234d. The wheels 234 may be wheels that are capable of allowing the self-driving transport vehicle 210 to turn, such as castors, omni-directional wheels, and mecanum wheels. In some embodiments, the self-driving transport vehicle 210 can be equipped with special tires for rugged surfaces or particular floor surfaces unique to its environment.

The sensor system 220 in FIG. 2 includes example sensors 220a, 220b, 220c, and 220d. The sensors 220a, 220b, 220c, and 220d can be optical sensors arranged to provide three-dimensional (e.g. binocular or RGB-D) imaging.

The positions of the components 234, 220, 240, 230, 232 of the self-driving transport vehicle 210 are shown for illustrative purposes and are not limited to the illustrated positions. Other configurations of the components 234, 220, 240, 230, 232 can be used depending on the application of the self-driving transport vehicle 210 and/or the environment in which the self-driving transport vehicle 210 will be used.

Figure 3A:
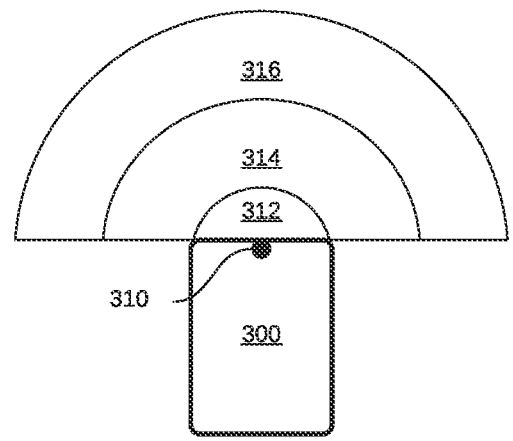
FIG. 3A is a safety-field diagram of a self-driving vehicle, according to at least one embodiment.

Referring to FIG. 3A, there is shown a self-driving vehicle 300 with associated safety fields. In the example shown in FIG. 3A, the self-driving vehicle 300 has a navigational sensor 310 located at the front of the vehicle 300 and the centerline of the vehicle 300. Three safety fields are shown, each of which extends radially from the sensor 310. Each safety field is shown as a semi-circle, which is a consequence of the placement of the sensor 310 on the vehicle 300. In other words, the safety fields do not extend behind the front edge of the vehicle 300 since, in the example provided, the sensor 310 is obscured by the body of the vehicle 300 itself; in other words, creating blind spots. Accordingly, different placements of the sensor on the vehicle will result in different blinds spots.

The safety fields generally describe a region of the environment in which the vehicle 300 is operating. In particular, when an obstacle is detected by the sensor 310 within a safety field, a safety routine may be evoked for the vehicle 300 in order to avoid or minimize the impact of a collision between the vehicle 300 and the obstacle. One example of a safety routine is a safety stop, in which the vehicle is immediately stopped. According to some embodiments, a safety stop can include cutting power to the drive motors (e.g. drive system) of the vehicle 300.

Typical obstacles can include a human pedestrian, another vehicle, or any other object that is unexpectedly found within the safety field.

Each of the safety fields can be considered to correspond to a particular speed or speed threshold of the vehicle 300. For example, the safety field 312 may be associated with a first speed or speed threshold. The safety field 314 may be associated with a second speed or speed threshold that is greater than the first speed. The safety field 316 may be associated with a third speed or speed threshold that is greater than the second speed.

A particular safety field may be used by the vehicle 300 depending on a safe stopping distance of the vehicle 300. For example, it may be desired to ensure that collisions are avoided by having the vehicle 300 stop before colliding with an object within the safety field. Alternatively, or additionally, it may be desired to ensure that, in the worst case, any collisions that are experienced are below a maximum impact force. (As such, the case of stopping the vehicle 300 prior to a collision may be considered the same as a collision with zero impact force).

With this in mind, the safe stopping distance can be determined in a variety of ways, having regard to the mass of the vehicle 300 and the deceleration of the vehicle 300 as it is coming to a stop.

According to some embodiments, a data table may be derived that associates the safe stopping distance of the vehicle 300 at particular speeds. For example, such a table may be based on the assumption that the vehicle 300 is carrying its maximum payload (i.e. that total mass of the system is the mass of the vehicle plus the mass of the maximum payload that the vehicle 300 can carry). Considering this total mass, safe stopping distances can be determined for particular speed thresholds. For example, FIG. 3A could be used to illustrate that, below a first speed threshold, the vehicle 300 will use the first safety field 312. If the speed of the vehicle is greater than the first speed threshold but below a second speed threshold, then the vehicle 300 will use the second safety field 314. Similarly, if the speed of the vehicle is greater than the second speed threshold but below a third speed threshold, then the vehicle will use the third safety field 316. According to some embodiments, the highest speed threshold (e.g. the third speed threshold, corresponding to the safety field 316) may be the maximum operating speed of the vehicle 300.

According to some embodiments, the safety field may be dynamically and/or automatically adjusted as the speed of the vehicle is changed. For example, as the speed of the vehicle is changed, a corresponding new safety stopping distance may be calculated, and the new safe stopping distance may be used to determine a corresponding new safety field.

Generally, the safety fields may be described in terms of a range (or depth) and an angular sweep (or width). Referring to the examples in FIG. 3A, the range of the safety field corresponds to the radius of the respective field from the sensor 310, and the angular sweep is approximately 180° (e.g. corresponding to the natural blind spots caused by the placement of the sensor 310 relative to the body of the vehicle 300). In other words: generally, as the speed of the vehicle 300 increases, the range of the safety field increases. For example, if the sensor 310 is a LiDAR device (i.e. with a rotating laser scan), then the safety field can be established by controlling the range of the LiDAR and the scan angle. Similarly, if the sensor 310 is a vision system (e.g. one or more video cameras), then the safety field can be established by controlling the depth and field of view of the vision system. According to some embodiments, the safety field may be established by applying a filter to the data from the LiDAR device or vision system.

According to some embodiments, the determination of the safe stopping distance (or other parameters for establishing the safety field) may be based not only on the speed of the vehicle, but on vehicle dynamics attributes of the vehicle, such as the mass of the vehicle, the mass of a payload (and/or other equipment installed) on the vehicle, the braking force of the vehicle, and the condition of the vehicles components (e.g. the brakes and/or motor which may degrade over time and thus affect the safe stopping distance).

According to some embodiments, the speed or speed threshold pertaining to a particular safety field may be described as a velocity or velocity threshold. For example, as depicted in FIG. 3A, the safety fields may be considered to be based on the assumption that the vehicle 3A is driving in a straight line, moving forwards.

Figure 3B:
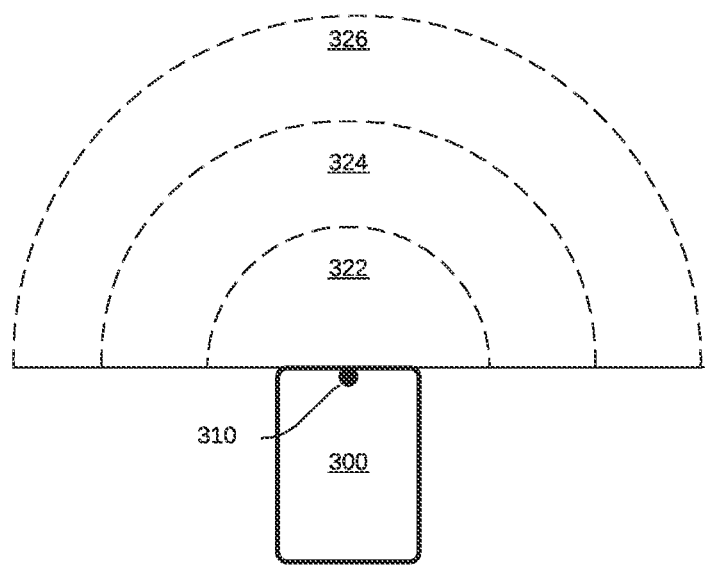
FIG. 3B is a footprint diagram of a self-driving vehicle, according to at least one embodiment.

Referring to FIG. 3B, there is shown the self-driving vehicle 300 with associated footprints corresponding to the safety fields previously described in view of FIG. 3A. Generally, footprints differ from safety fields in that footprints are larger; and footprints are used in order to prevent obstacles from entering the safety fields. Since an obstacle detected within a safety field triggers a safety routine (e.g. a safety stop), it may be desirable to avoid having obstacles enter the safety fields, in order to avoid safety routines that can be costly in terms of time or surprising to onlookers.

In other words: when an obstacle is detected within the footprint of the vehicle 300, the vehicle attempts to steer (e.g. change its course) in order to avoid having the obstacle enter the safety field, which is generally a smaller area than the footprint.

The footprints correspond to a safety field. As such, the footprint 322 corresponds to the safety field 312; the footprint 324 corresponds to the safety field 314; and the footprint 326 corresponds to the safety field 316. According to some embodiments, the geometry of each footprint may be based on the geometry of the corresponding safety field. In the examples shown in FIG. 3A and FIG. 3B, each of the safety fields and footprints is a half disc (defined by a semi-circle), and the radius (i.e. range) of each footprint is greater than the radius of the corresponding safety field.

Generally, the footprints may be defined using sensors in the same way as previously described for the safety fields.

For the sake of simplifying explanation, FIG. 3C through FIG. 8 depict, and are described in terms of safety fields. However, analogous depictions and descriptions are implied with respect to corresponding footprints as well. For each safety field described hereafter, there may be a corresponding footprint as generally described in terms of FIG. 3A and FIG. 3B.

Figure 3C:
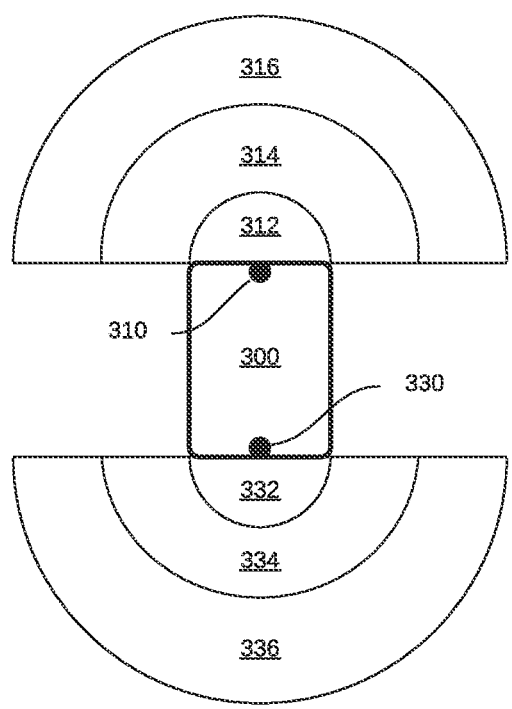
FIG. 3C is a safety-field diagram of a self-driving vehicle with forward-facing and rearward-facing safety fields, according to at least one embodiment.

Referring to FIG. 3C, there is shown the self-driving vehicle 300 with a forward-facing sensor 310 and a rearward-facing sensor 330. Rearward-facing safety fields 332, 334, and 336 may be used in respect of the rearward-facing sensor 330, in the same way as the forward-facing safety fields 312, 314, and 316 have been described in respect of the forward-facing sensor 310.

Rearward-facing safety fields may be useful for reducing injury or damage from accidents with objects (e.g. human pedestrians) who are approaching the vehicle 300 unexpectedly from behind. Furthermore, rearward-facing safety fields may be useful for avoiding collision when the vehicle 300 is performing a turn-in-place (i.e. rotational) operation. For example, if the vehicle 300 is equipped with differential drive motors, and/or multi-directional wheels, the vehicle may be able to rotate without necessarily moving in a linear direction, in which case the parts of the safety fields extending beyond the sides of the vehicle 300 may help avoid collision with obstacles at the side of the vehicle 300. Furthermore, rearward-facing safety fields may be useful for bi-directional vehicles, such that the vehicle may not have a persistent front and back direction, but may instead drive in the opposite direction at any given time.

According to some embodiments, and unlike the example depicted in FIG. 3C, the forward-facing and rearward-facing safety fields need not be symmetrically disposed about the vehicle. For example, it may not be necessary or desirable for the rearward-facing safety field to be as large as the forward-facing safety field, since the vehicle is travelling in the forward direction. As will be further described below, when the vehicle is turning (i.e. driving in an arc), the forward-facing safety field may be adjusted to account for the arced path of the vehicle, but a similar adjustment may not be necessary for the rearward-facing safety field.

Figure 3D:
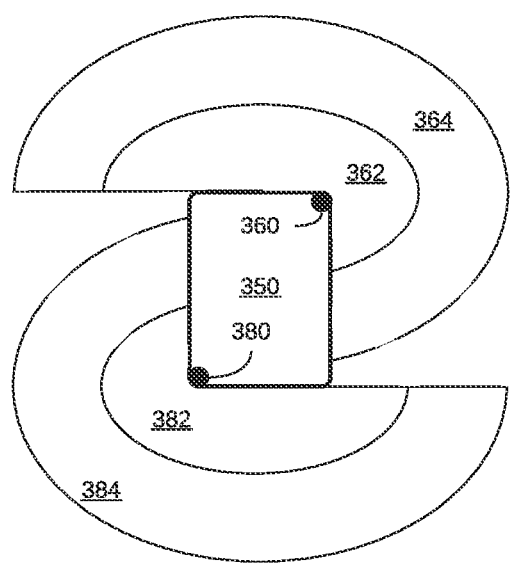
FIG. 3D is a safety-field diagram of a self-driving vehicle with front-corner and opposing rear-corner safety fields, according to at least one embodiment.

Referring to FIG. 3D, there is shown a self-driving vehicle 350 with a forward-facing sensor 360 and a rearward-facing sensor 380. In the example shown, the sensor 360 is located on a front-right corner of the self-driving vehicle 350, and the sensor 380 is located on a rear-left corner of the self-driving vehicle 350.

According to some embodiments, orientation of the sensors 360 and 380 on the vehicle 350 can be described as front-corner and opposing rear-corner. In such a configuration, one sensor (e.g. the sensor 360) can provide a safety field to the front and on one side of the vehicle 350, while the other sensor (e.g. the sensor 380) can provide a safety field to the rear and on the other side of the vehicle 350. Various configurations of such a front-corner and opposing rear-corner are possible.

The self-driving vehicle 350 is exemplary of how the placement of sensors can be made in order to provide different safety field coverages for a self-driving vehicle. It is also exemplary of the fact that the coverage of a safety field can be made somewhat independently of the placement of the sensors. (The coverage is somewhat independent of the placement of the sensors since there will always be some dependence due to natural blind spots that may occur if the sensor is obscured by the body of the vehicle in certain placements).

For example, and as shown in FIG. 3D, the safety fields 362, 364, 382, and 384 are generally elliptical or ovular in shape. Generally, the range of the field set may vary as a function of the angular sweep from the sensor. For example, if the sensor 360 is a LiDAR sensor that sweeps through 360°, then the range of the sensor (e.g. the radius of the ellipse-like region) may be varied as the sensor sweeps through 360°. In this way, the safety field can take on any geometric shape; and, notwithstanding any blind spots, any geometric shape can be obtained from a sensor placed anywhere on the vehicle.

Figure 4:
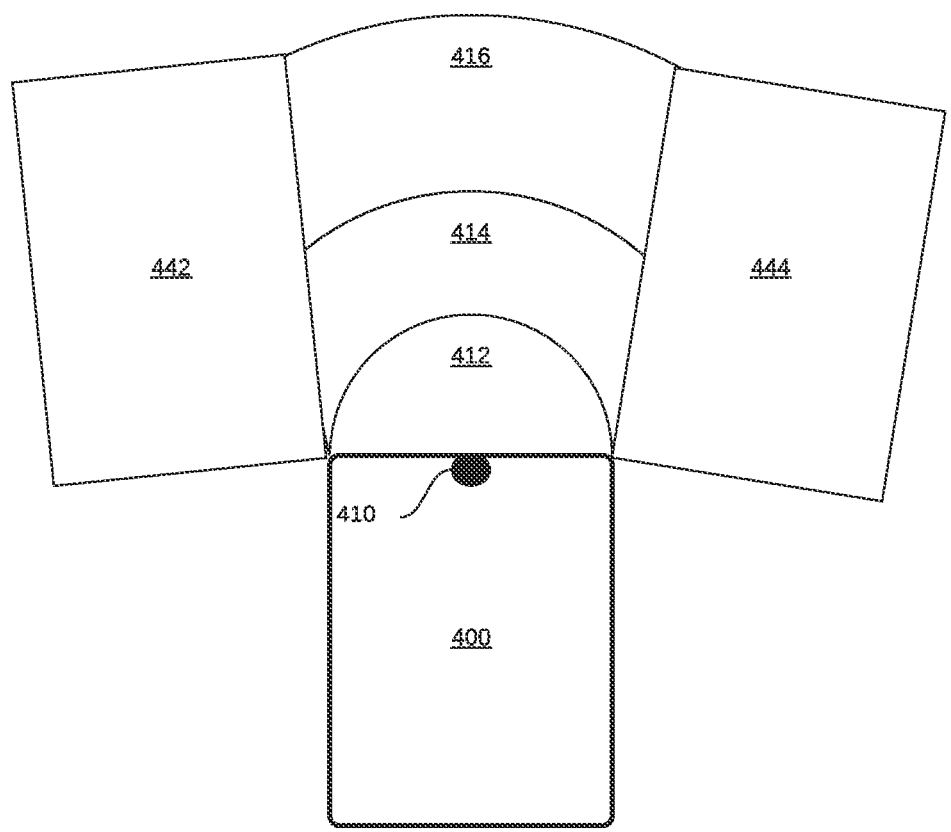
FIG. 4 is a safety-field diagram of a self-driving vehicle with exclusion regions omitted from the safety fields, according to at least one embodiment.

Referring to FIG. 4, there is shown a self-driving vehicle 400 having three safety fields 412, 414, and 416. The safety fields may be determined and generated as previously described. As compared to the safety fields 312, 314, and 316 in FIG. 3A, the safety fields 412, 414, and 416 can be described in terms of exclusion regions 442 and 444. In other words, the safety fields 412, 414, and 416 can be determined by first determining the safety fields 312, 314, and 316 respectively, then determining the exclusion regions 442 and 444, and then omitting the exclusion regions from the safety fields 312, 314, and 316. According to some embodiments, once the safety fields 412, 414, and 416 have been determined, the sensor 410 can be instructed to generate the safety fields as previously described.

Figure 5:
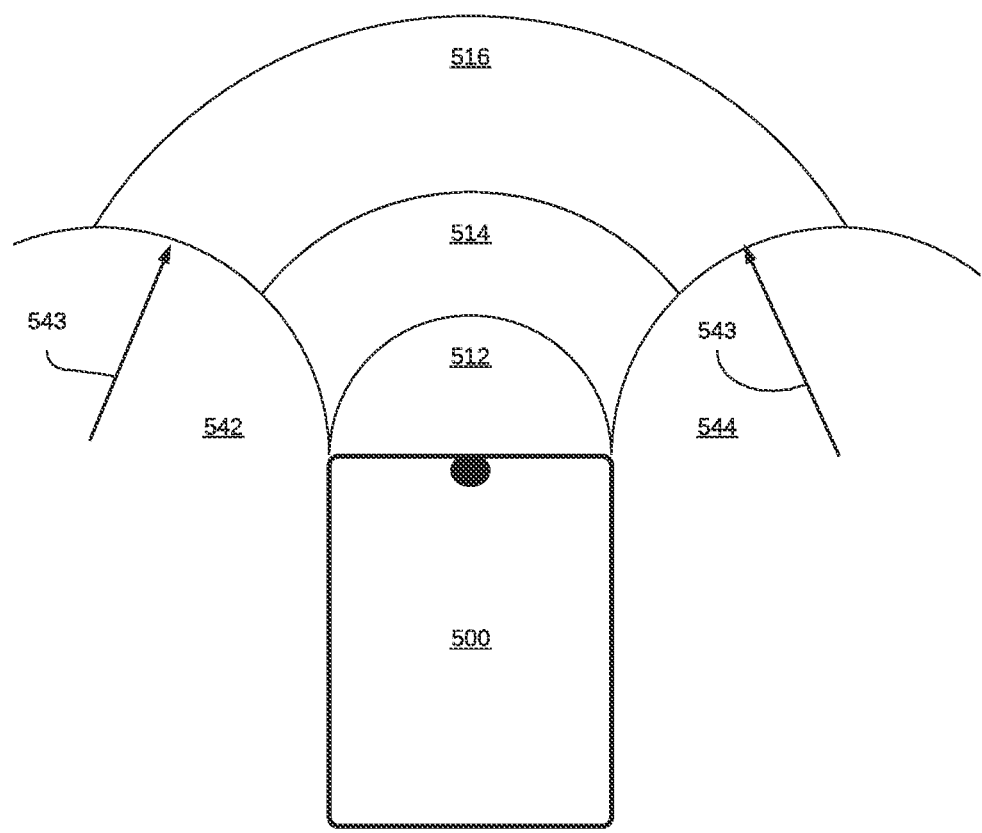
FIG. 5 is a safety-field diagram of a self-driving vehicle with exclusion regions omitted from the safety fields, according to at least one embodiment.

Referring to FIG. 5, there is shown a self-driving vehicle 500 having three safety fields 512, 514, and 516. The safety fields may be described (and/or determined) with respect to the exclusion regions 542 and 544 as generally described in respect of FIG. 4. Specifically, the safety fields and exclusion regions in FIG. 5 differ from those in FIG. 4 in that the exclusion regions 542 and 544 are generally circular. While any particular geometry may be used for a safety field (and/or an exclusion region), the safety fields 512, 514, and 516, and exclusion regions 542 and 544 are associated with a minimum turning radius (indicated by the radial arrows 543) for the self-driving vehicle.

According to some embodiments, the self-driving vehicle 500 may be turned in one or both of a turn-in-place operation, or by driving in an arc. The minimum turning radius is generally applicable to the case of driving in an arc.

According to some embodiments, the self-driving vehicle 500 may include a drive system having differential drive motors. In such a case, the differential drive motors can perform a turn-in-place operation by driving the differential drive motors in opposite directions, or by driving one drive motor and not another. Such a vehicle may also be driven in an arc by driving both differential drive motors in the same direction but at different speeds.

According to some embodiments, the self-driving vehicle 500 may be equipped with a steering system such as an Ackerman type steering system. In such a case, the vehicle may be driven in an arc using the steering system.

FIG. 5 is exemplary of a scenario in which a minimum turning radius 543 is known to apply to the self-driving vehicle 500. Since the self-driving vehicle 500 is associated with a minimum turning radius 543, then, according to some embodiments, it may not be necessary to include the exclusion regions 542 and 544 within the safety fields 512, 514, and 516, since the vehicle 500 cannot turn (i.e. drive in an arc) into the exclusion regions 542 and 544. Since the vehicle 500 cannot be driven into the exclusion regions 542 and 544, the risks of colliding with an obstacle with the exclusion regions may be acceptably low. As such, the exclusion regions 542 and 544 may be omitted from the safety fields 512, 514, and 516.

Figure 6:
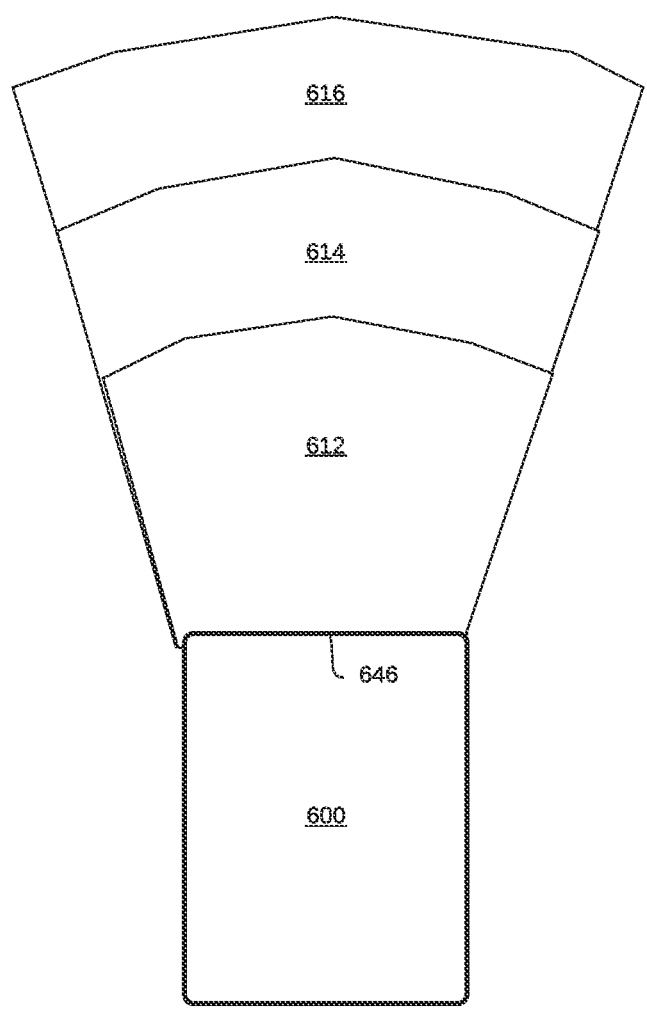
FIG. 6 is a safety-field diagram of a self-driving vehicle with polygonal safety fields, according to at least one embodiment.

Referring to FIG. 6, there is shown a self-driving vehicle 600 with three safety fields 612, 614, and 616. FIG. 6 is exemplary of a scenario in which the safety fields are defined in terms of a polygon. In the simple example shown, each of the safety fields is represented by a pentagon. (For clarity, and with analogy to the safety fields and footprints described elsewhere: each of the safety fields 612, 614, and 616 include the boundary line 646. In other words, as depicted in FIG. 6, the safety fields are overlapping such that the area of the safety field 616 includes the area of the safety field 614, and the area of the safety field 614 includes the area of the safety field 612). Generally, the safety fields may have a polygonal geometry pertaining to any polygon. According to some embodiments, polygons may represent a convenient form for calculation and determination of the safety fields.

Figure 7:
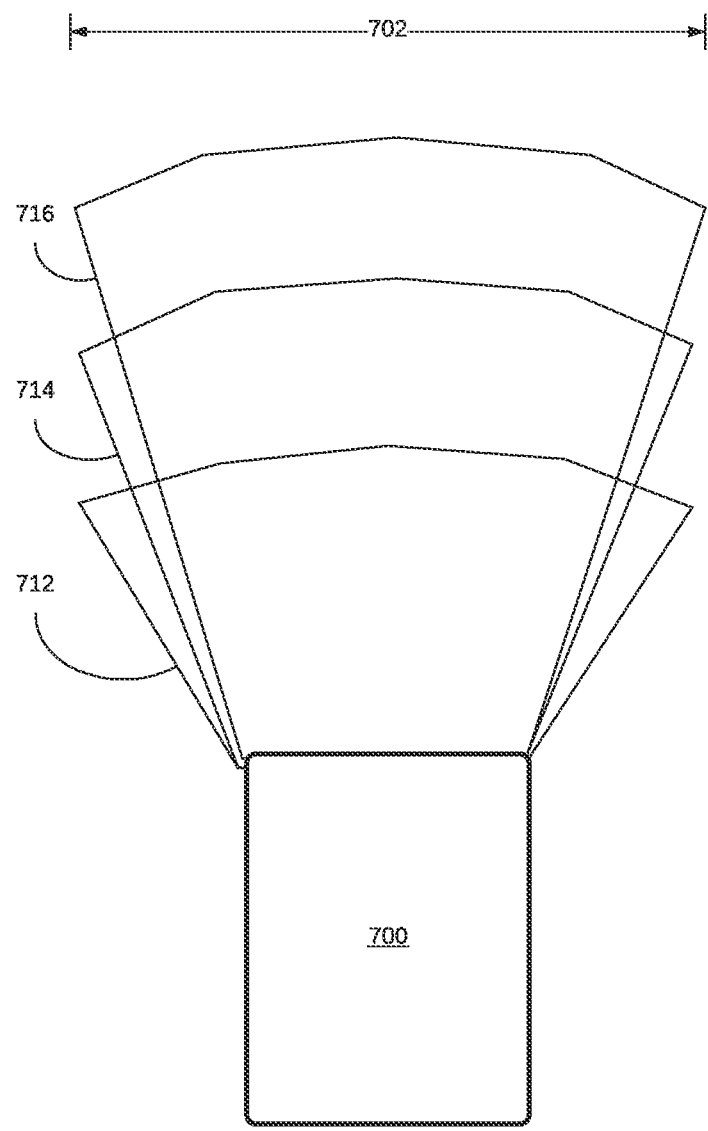
FIG. 7 is a safety-field diagram of a self-driving vehicle with multiple safety fields based on a navigational constraint, according to at least one embodiment.

Referring to FIG. 7, there is shown a self-driving vehicle 700 with three polygonal safety fields 712, 714, and 716. The safety fields 712, 714, and 716 differ from the safety fields 612, 614, and 616 previously described, in that each of the safety fields 712, 714, and 716 is determined based on a navigational constraint. Navigational constraints may represent, for example, a minimum navigable width, a minimum turning radius, a maximum speed, a maximum turning speed, etc.

The width indicated by the arrow 702 represents a minimum navigable width navigational constraint. According to some embodiments, the minimum navigable width may be determined by the width of a roadway, path, aisle, etc. through which the vehicle 700 is going to traverse. For example, in a manufacturing or warehouse facility, the maximum width of an aisle may be eight feet. Based on this, a minimum navigable width of eight feet may be determined.

Each of the safety fields 712, 714, and 716 may be determined based on the navigational constraint represented by the width 702. As such, the maximum width of each safety field is the same. The result is that, as the safety fields become larger (i.e. the greater the range), they become proportionally narrower. In other words, the angle from the side of the safety field 716 to the front of the vehicle 700 is less than the angle from the side of the safety field 714 (and the safety field 712) to the front of the vehicle 700. According to some embodiments, the angle from the side of the safety field to the front of the vehicle may be associated with the turning radius of the vehicle below which the vehicle could steer in an arc and collide with an obstacle that was not previously within the safety field.

Since each safety field corresponds to a different speed (i.e. the speed for the safety field 716 is the highest and the speed for the safety field 712 is the lowest), the slower the vehicle is moving, the lower the turning radius (i.e. the more it can steer in an arc) while still maintaining possible obstacles within the safety field. As the vehicle speed increases, the vehicle must drive in a relatively straighter line in a forward direction in order to avoid steering beyond the safety field and colliding with obstacles that are not in the safety field. This can be mathematically framed as a maximum rotational speed which has an absolute value inversely related to the vehicle translational speed.

Figure 8:
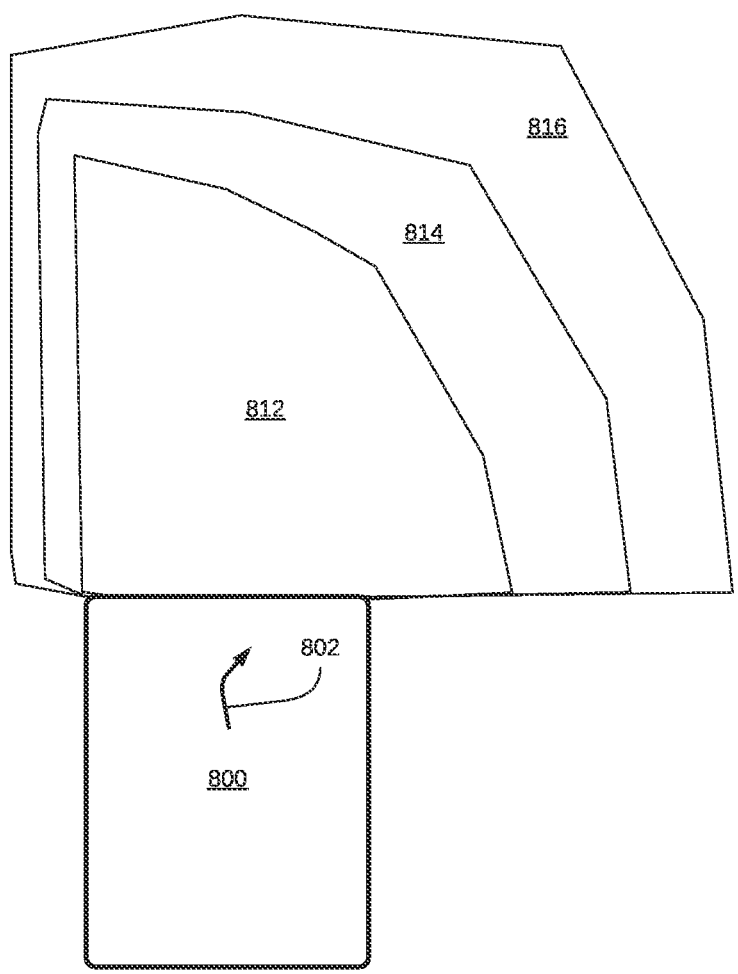
FIG. 8 is a safety-field diagram for a self-driving vehicle turning to the right, according to at least one embodiment.

Referring to FIG. 8, there is shown a self-driving vehicle 800 with three polygonal safety fields 812, 814, and 816. As indicated by the arrow 802, the vehicle 800 is in the process of turning to the right. In other words, in the example shown in FIG. 8, the vehicle 802 has an angular velocity.

Two different types of turns have previously been described: a turn-in-place operation; and driving in an arc. These two types of turns can be described in terms of velocity. Generally, it can be said that when the vehicle 800 is turning, it has an angular velocity with an absolute value greater than zero. Specifically, when the vehicle 800 is performing a turn-in-place operation, it has an angular velocity with absolute value greater than zero, and no linear velocity (i.e. a linear velocity equal to or very near to zero). When the vehicle 800 is driving in an arc, it has an angular velocity and a linear velocity (each with absolute magnitudes greater than zero).

It is also possible to describe these velocities in terms of speeds. Generally, the magnitude of the velocity may be analogous to a speed (e.g. angular/rotational speed; linear speed). The direction of the velocities can also be described along with the speed (e.g. forward versus backward for linear speed; clockwise/right versus counter-clockwise/left for angular speed).

According to some embodiments, either or both of the size (e.g. range) and the geometry (e.g. angular sweep and range as a function of angular sweep) of a safety field can be determined entirely, or in part, based on one or both of the linear velocity (or speed) and the angular velocity (or angular speed) of the vehicle 800.

As shown in the example of FIG. 8, since the vehicle 800 is turning to the right, the geometry of the safety fields is determined accordingly. In other words, the safety fields extend further to the right ahead of the vehicle 800 and less to the left ahead of the vehicle 800 (e.g. as compared to the safety fields in the previously-described FIG. 3A through FIG. 7).

Figure 9:
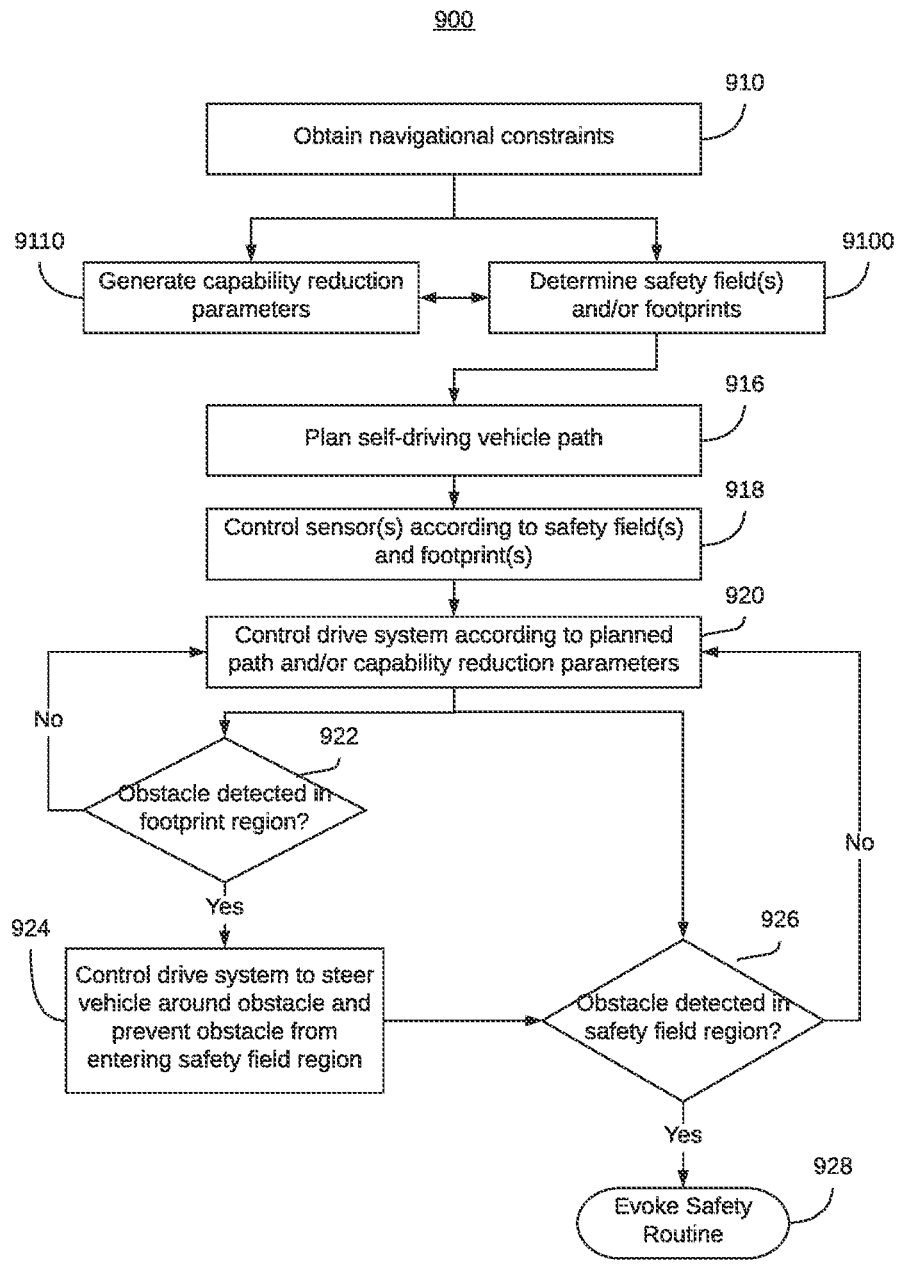
FIG. 9 is a method for self-driving vehicle collision avoidance, according to at least one embodiment.

Referring to FIG. 9, there is shown a method 900 for self-driving vehicle collision avoidance, according to at least one embodiment. The method 900 may generally be executed by a self-driving vehicle. The method 900 may be executed along with, or may include one or both of the methods 1000 and 1100. According to some embodiments, any or all of the methods 900, 1000, and 1100 may be represented in computer-instructional code stored on non-volatile, computer-readable media, which, when executed by a processor (e.g. a processor of a self-driving vehicle), cause the processor to be configured to execute some or all of the steps of the methods.

According to some embodiments, the method 900 may begin at step 910, when the self-driving vehicle obtains navigational constraints. Navigational constraints may represent, for example, a minimum navigable width, a minimum turning radius, a maximum speed, a minimum speed.

According to some embodiments, navigational constraints may be static, meaning that they may be obtained once, for example, when the vehicle is configured for use in a particular facility. In other words, based on the characteristics of the facility in which the vehicle is to be used (e.g. a warehouse with particular aisle widths), navigational constraints may be set (and then remain unchanged) when the vehicle is initially configured for that facility.

According to some embodiments, navigational constraints may be dynamic and/or automatically generated as the vehicle move through the facility. As the vehicle moves through its environment (e.g. a warehouse facility), it may use the vehicle's sensors to determine a navigational constraint. For example, as the vehicle is travelling through the facility, it may recognize an aisle and measure the aisle width. The vehicle may then determine navigational constraints based on the aisle width that it has measured.

According to some embodiments, navigational constraints may be associated with a specific location within the vehicle's environment. For example, navigational constraints may be embedded in or associated with an electronic map that the vehicle uses in order to navigate its environment. Navigational constraints may be provided, for example by a fleet-management system, based on the vehicle's location relative to the map.

At, or prior to step 910, the vehicle may be in the process of executing a mission, and/or travelling to a particular destination. According to some embodiments, the vehicle may be executing a planned path.

At step 9100, the method determines the safety field(s) and/or footprint(s) for the vehicle. According to some embodiments, the method may also execute step 9110. Step 9100 and step 9110 may be executed in parallel (i.e. concurrently); or in any order. As will be apparent and further described, and as indicated by the double-ended arrow, according to some embodiments, the execution of step 9110 may be a step precedent to, and informing step 9100. According to some embodiments, the execution of step 9100 may be a step precedent to, and informing step 9110. In other words, the generation of the capability reduction parameters may inform the determination of the safety fields; and vice-versa.

Figure 10:
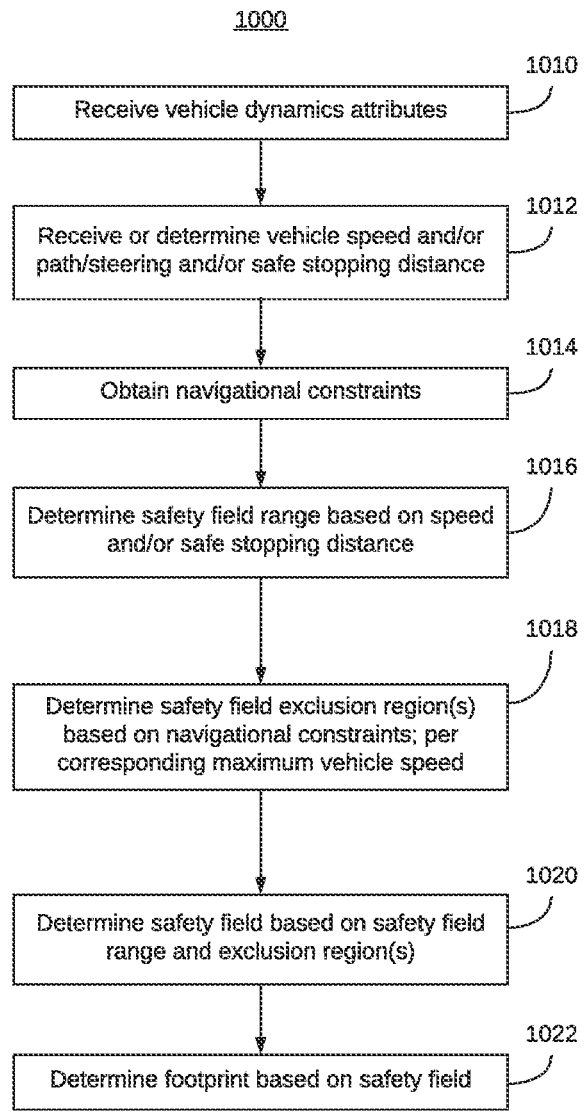
FIG. 10 is a method for determining safety fields and footprints for a self-driving vehicle, according to at least one embodiment.
Figure 11:
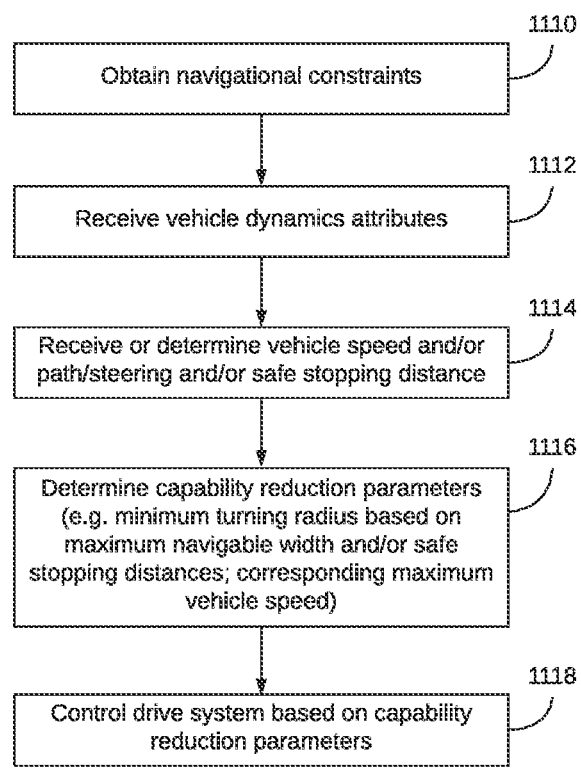
FIG. 11 is a method for determining capability reduction parameters, according to at least one embodiment.

According to some embodiments, step 9110 may be performed according to any or all of the steps of the method 1100 as provided in FIG. 11. According to some embodiments, step 9100 may be performed according to any or all of the steps of the method 1000 as provided in FIG. 10.

At step 916, a path may be planned for the self-driving vehicle. According to some embodiments, the self-driving vehicle may autonomously plan the path. According to some embodiments, the self-driving vehicle may have previously been executing a path; but the determination (or re-determination) of the capability reduction parameters during step 9110 and/or the safety fields during the stop 9100 may necessitate the re-planning of a new path, since the safety fields affect the vehicle's navigable space restrictions.

At step 918, the vehicle controls its sensors according to the safety field(s) and/or footprint(s) that were generated during step 9100. According to some embodiments, the sensors may include one or more LiDAR device; and controlling the sensors may comprise controlling the range and/or sweep angle of the LiDAR device.

At step 920, the drive system of the vehicle is control in order to drive the vehicle along the planned path. In the case that capability reduction parameters were generated during step 9110, step 922 includes controlling the drive system according to the capability reduction parameters.

According to some embodiments, the self-driving vehicle may comprise two (or more) differential drive motors. Controlling the drive system may comprise controlling (e.g. limiting) the speed differential between the motors and/or the maximum speed of one or all of the drive motors.

According to some embodiments, the self-driving vehicle may comprise a steering system and a drive motor. Controlling the drive system may comprise controlling (e.g. limiting) the steering and/or the maximum speed of the drive motor.

Step 922 and step 926 may be executed together (e.g. simultaneously, interlaced, etc.) while the vehicle is being driving. If an obstacle is detected within the footprint region then, at step 922, the method proceeds to step 924. If an obstacle is not detected within the footprint region then, at step 922, the method proceeds to step 920 and the vehicle continues to be driven according to the planned path and/or capability reduction parameters.

According to some embodiments, step 922 comprises the control system receiving a signal from the sensor system that indicates the presence of an object within the footprint region.

At step 924, the drive system is controlled in order to steer the vehicle around the obstacle that was detected in the footprint region. In particular, the vehicle is steered in order to prevent the obstacle from entering the safety field. In other words, the footprint may serve as a means of avoiding a safety routine such as a safety stop, which would otherwise occur when the obstacle enters the safety field. After step 924, the method proceeds to step 926.

If an obstacle is not detected within the safety field region then, at step 926, the method proceeds to step 920 and the vehicle continues to be driven according to the planned path and/or capability reduction parameters.

Referring to FIG. 10 there is shown a method 1000 for determining safety fields and footprints for a self-driving vehicle, according to some embodiments. The method 1000 may begin at step 1010.

At step 1010, vehicle dynamics attributes are received. According to some embodiments, the vehicle dynamics attributes may be received by a processor of the vehicle (e.g. a processor the control system) from non-transitory computer-readable media of the vehicle (e.g. a memory of the control system).

According to some embodiments, the vehicle dynamics attributes may comprise any or all of attributes associated with the vehicle's steering, braking, and acceleration capabilities, the vehicle's mass, width, length, height, the condition (e.g. state of wear) of vehicle components such as motors, brakes, and wheels, and the attributes of a payload (and/or additional equipment) being carried by the vehicle such as mass, width, length, and height.

According to some embodiments, any or all of the vehicle dynamics attributes may be provided to the memory by a fleet-management system (or other computer system) in communication with the vehicle, manually (e.g. by human operator), and/or by a vehicle sensor. For example, sensors on the vehicle may detect the attributes of a payload (and/or additional) equipment being carried by the vehicle, the condition of the vehicle components, and the vehicle's steering, braking, and acceleration capabilities.

According to some embodiments, the method 1000 may include step 1012. At step 1012, any or all of the vehicle's speed, path, steering, and safe stopping distance may be received or determined. According to some embodiments, any or all of the vehicle's speed, path, steering, and safe stopping distance may be received or determined by a processor of the vehicle (e.g. a processor of the control system), for example, being received from non-transitory computer-readable media of the vehicle (e.g. a memory of the control system).

According to some embodiments, any or all of the vehicle's speed, path, steering, and safe stopping distance may be received from a fleet-management system (or other computer system) in communication with the vehicle.

According to some embodiments, any or all of the vehicle's speed, path, steering, and safe stopping distance may be provided to the memory by a vehicle sensor. The safe stopping distance may be determined, for example by a processor of the vehicle, based on any or all of the speed, path, and steering of the vehicle.

For example, sensor on the vehicle (e.g. odometers, rotary encoders, the LiDAR or other time-of-flight sensor, GPS) may be used to measure the speed of the vehicle. The linear and angular velocities of the vehicle may be determined. Based on this, and, in some embodiments, in further consideration of the mass of the vehicle (which may include the mass of a payload and other equipment), a safe stopping distance may be determined.

It may be desired to ensure that collisions with obstacles are avoided by having the vehicle stop before colliding with an object. Alternatively, or additionally, it may be desired to ensure that, in the worst case, any collisions that are experienced are below a maximum impact force. Based on the desire to stop the vehicle (or to have any collisions below a force, energy, or momentum threshold), a safe stopping distance can be determined such that, for distances greater than the safe stopping distance, the vehicle will be stopped (or below the force, energy, or momentum threshold).

According to some embodiments, the method 1000 may include step 1014. At step 1014, navigational constraints are received, as previously described in respect of step 910 in the method 900. Step 1014 may be the same as, or redundant to step 910; in other words, if step 910 has previously been executed, then step 1014 may be omitted.

According to some embodiments, any or all of step 1010, step 1012, and step 1014 may be executed in any order, or in parallel.

At step 1016, the safety field range is determined. According to some embodiments, the range of the safety field may be based on the safe stopping distance and/or the speed. According to some embodiments, a static mass attribute may be associated with the vehicle (e.g. based on the assumption that the mass doesn't change), and, therefore, the safe stopping distance may be easily determined or approximated directly by the vehicle's speed.

According to some embodiments, velocity may be used rather than speed. In such a case, an angular velocity can be used, which is associated with either a turn-in-place operation or driving in an arc. In such a case, the safety field may be asymmetrically disposed about the centerline of the vehicle (e.g. as in FIG. 8) by varying the range as previously described.

At step 1018, safety field exclusion regions may be determined. According to some embodiments, the safety field exclusion regions may be based the navigational constraints, which may include any or all of a minimum turning radius, a minimum navigable width, and stopping distance. According to some embodiments, the safety field exclusion regions may be based on the velocity of the vehicle (i.e. linear velocity and/or angular velocity). As such, the magnitude and/or direction of the velocity may be used to determine regions through which the vehicle is unlikely to travel, and these regions can be considered as exclusion regions (or parts thereof).

At step 1020, a safety field is determined based on the safety field range and the exclusion regions. According to some embodiments, the safety field is determined by taking the full range of the safety field and then subtracting the exclusion region(s).

At step 1022, a footprint can be determined based on the safety field. According to some embodiments, a footprint may have the same geometry as the associated safety field; and may have a range greater than the range of the safety field. According to some embodiments, the range and/or geometry of the footprint may be based on the associated safety field and/or the speed or velocity of the vehicle. For example, as the vehicle speed increases, a footprint size may also increase. According to some embodiments, the proportional size of the footprint relative to the safety field may increase as the vehicle's speed increases.

Referring to FIG. 11, there is shown a method 1100 for determining capability reduction parameters, according to at least one embodiment. The method 1100 may begin with step 1110.

At step 1110, navigational constraints are obtained. Step 1110 is generally analogous to step 1014 of the method 1000 as previously described. At step 1112, vehicle dynamics attributes are received. Step 1112 is generally analogous to step 1010 of the method 1000 as previously described. At step 1114, a vehicle speed and/or steering, and/or a safe stopping distance are received or determined, as generally analogous to step 1012 of the method 1000 as previously described. According to some embodiments, any or all of step 1110, step 1112, and step 1114 may be executed in any order, or in parallel.

At step 1116, capability reduction parameters are determined. According to some embodiments, the capability reduction parameters may be determined by the vehicle (e.g. by the vehicle's control system). According to some embodiments, the capability reduction parameters may be received by the vehicle from a fleet-management or other computer system in communication with the self-driving vehicle.

According to some embodiments, the capability reduction parameters may pertain to any or all of a turning radius (e.g. a minimum turning radius) of the vehicle, a speed (e.g. a maximum speed) of the vehicle, and an acceleration (e.g. a maximum acceleration) of the vehicle.

According to some embodiments, the capability reduction parameters may be determined based any or all of the navigational constraints, vehicle dynamics attributes, and the vehicle speed, steering, and/or safe stopping distance. According to some embodiments, the capability reduction parameters may be determined as a function of the vehicle's speed.

For example, a navigational constraint may represent a minimum navigable width. Similarly, the vehicle dynamics attributes may pertain to inherent steering limitations of the vehicle (e.g. when driving over a particular speed, steering the vehicle by driving an arc may cause the vehicle and/or the payload the vehicle is carrying to become unstable). In both these cases, a capability reduction parameter pertaining to a minimum turning radius may be determined.

At step 1118, the drive system of the vehicle is controlled according to the capability reduction parameters. According to some embodiments, the control system may control the drive system according to the capability reduction parameters. For example, the drive system may include a differential drive system, such as having two or more drive wheels. The differential drive system may enable both linear speed and acceleration (by driving the drive wheels at the same speeds) as well as turn-in-place or driving an arc by driving the drive wheels at different speeds and/or in different directions. Similarly, the drive system may include a single drive motor (or, generally, one or more drive wheels that are driven at the same speed) and a steering system such as an Ackerman type steering system. In these cases, the control system may control the drive motors and/or steering system in order prevent the vehicle from steering below the minimum turning radius and/or exceeding the maximum speed.

According to some embodiments, any or all of the steps of the method 1000 and/or the method 1100 may be executed once for each of a multiple of speed thresholds. Referring back to FIG. 3A through FIG. 8, a vehicle may determine a set of safety fields (and corresponding footprints) such that, as the speed of the vehicle increases above (or decreases below) a speed threshold, a new safety field (and corresponding footprint) from the set is selected.

According to some embodiments, any or all of the steps of the method 1000 and/or the method 1100 may be executed on an ongoing basis such that the safety field (and corresponding footprint) may be determined dynamically according to the vehicle's then-current speed (or velocity).

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers may be a server, network appliance, embedded device, computer expansion module, a personal computer, laptop, a wireless device or any other computing device capable of being configured to carry out the methods described herein.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims.

We claim:

1. A method for self-driving vehicle collision avoidance, the method comprising:
   receiving, with a control system of a self-driving vehicle, at least one vehicle dynamics attribute pertaining to the self-driving vehicle, and a velocity of the self-driving vehicle;
   determine a safety field for the self-driving vehicle based on the at least one vehicle dynamics attribute and the velocity of the self-driving vehicle;
   control at least one sensor of the self-driving vehicle according to the safety field, wherein the at least one sensor is operated to monitor the safety field during operation of the self-driving vehicle; and
   determining a safe stopping distance based on the at least one vehicle dynamics attribute and the velocity of the self-driving vehicle, and determining the safety field based on the safe stopping distance.

2. The method of claim 1, wherein receiving the velocity of the self-driving vehicle comprises receiving one or more of a linear velocity of the self-driving vehicle and an angular velocity of the self-driving vehicle.

3. The method of claim 1, wherein receiving the at least one vehicle dynamics attribute comprises receiving a steering capability pertaining to the self-driving vehicle.

4. The method of claim 1 comprises determining the safe stopping distance based on a mass of a payload carried by the self-driving vehicle.

5. The method of claim 1 comprises determining the safe stopping distance based on a braking force of the self-driving vehicle.

6. The method of claim 1 comprises determining the safe stopping distance based on a condition of one or more braking components of the self-driving vehicle.

7. The method of claim 1 further comprises:
storing, in a memory, a plurality of predefined safe stopping distances, wherein each predefined safe stopping distance is associated with a respective range of velocity; and
determining the safe stopping distance based on the at least one vehicle dynamics attribute and the velocity of the self-driving vehicle with reference to the plurality of pre-defined safe stopping distances stored in the memory.

8. The method of claim 1 further comprises controlling a drive system of the self-driving vehicle based on one or more capability reduction parameters.

9. The method of claim 7, wherein the one or more capability reduction parameters comprises a minimum turning radius limit, and controlling the drive system comprises steering the self-driving vehicle at a turning radius in accordance with the minimum turning radius limit.

10. A collision avoidance system for a self-driving vehicle, the system comprising:
one or more sensors; and
a control system in communication with the one or more sensors, the control system being operable to:
receive at least one vehicle dynamics attribute pertaining to the self-driving vehicle and a velocity of the self-driving vehicle;
determine a safety field for the self-driving vehicle based on the at least one vehicle dynamics attribute and the velocity of the self-driving vehicle;
control the one or more sensors of the self-driving vehicle according to the safety field, wherein the one or more sensors is operated to monitor the safety field during operation of the self-driving vehicle; and
determine a safe stopping distance based on the at least one vehicle dynamics attribute and the velocity of the self-driving vehicle, and to determine the safety field based on the safe stopping distance.

11. The system of claim 10, wherein the velocity of the self-driving vehicle comprises one or more of a linear velocity of the self-driving vehicle and an angular velocity of the self-driving vehicle.

12. The system of claim 10, wherein the at least one vehicle dynamics attribute comprises a steering capability pertaining to the self-driving vehicle.

13. The system of claim 10, wherein the control system is operable to determine the safe stopping distance based on a mass of a payload carried by the self-driving vehicle.

14. The system of claim 10, wherein the control system is operable to determine the safe stopping distance based on a braking force of the self-driving vehicle.

15. The system of claim 10, wherein the control system is operable to determine the safe stopping distance based on a condition of one or more braking components of the self-driving vehicle.

16. The system of claim 10, wherein the control system is further operable to:
store, in a memory, a plurality of predefined safe stopping distances, wherein each predefined safe stopping distance is associated with a respective range of velocity; and
determine the safe stopping distance based on the at least one vehicle dynamics attribute and the velocity of the self-driving vehicle with reference to the plurality of pre-defined safe stopping distances stored in the memory.

17. The system of claim 10, wherein the control system is operable to control a drive system of the self-driving vehicle based on one or more capability reduction parameters.

18. The system of claim 17, wherein the one or more capability reduction parameters comprises a minimum turning radius limit, and the control system is operable to control the drive system comprises steering the self-driving vehicle at a turning radius in accordance with the minimum turning radius limit.

* * * * *